(No Model.)
J. W. MALOY.
STONE SAWING MACHINE.
No. 351,874. Patented Nov. 2, 1886.
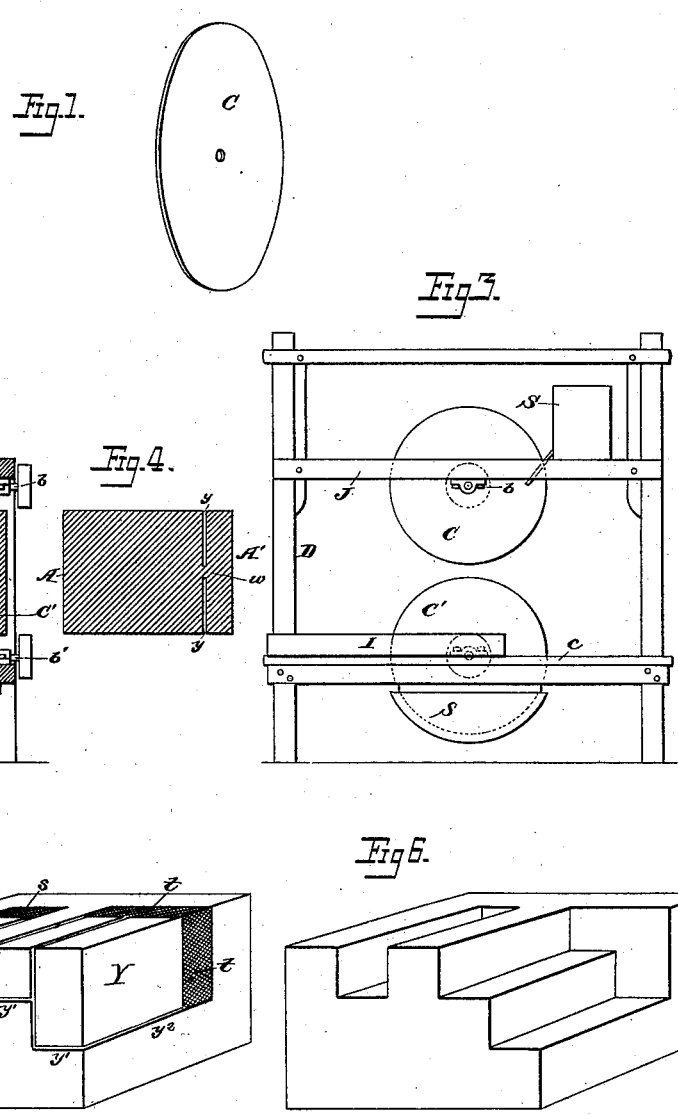
Attests:
John G. Hinkel Jr.
K. G. Hansmann.
Jas. W. Maloy,
Inventor:
By Foster & Freeman
Attorney

UNITED STATES PATENT OFFICE.

JAMES W. MALOY, OF BOSTON, MASSACHUSETTS.

STONE-SAWING MACHINE.

SPECIFICATION forming part of Letters Patent No. 351,874, dated November 2, 1886.

Application filed February 19, 1885. Serial No. 156,411. (No model.)

*To all whom it may concern:*

Be it known that I, JAMES W. MALOY, of Boston, in the county of Suffolk and State of Massachusetts, have invented new and useful Improvements in Stone-Cutting, of which the following, taken in connection with the accompanying drawings, is a specification.

My invention has for its object to increase the efficiency of the rapidly-revolving disks used in cutting stone; and my invention consists in the employment of cutter-disks or thin blades of metal revolving at a very high speed and arranged in the same plane, so as to cut partially through from opposite sides of a block, combined with a means for supplying abrading material thereto, as fully described hereinafter, and as illustrated in the accompanying drawings, in which—

Figure 1 is a perspective view illustrating one of the cutter-disks employed in carrying out my invention. Fig. 2 is a transverse section of a machine embodying my improvements. Fig. 3 is a side view of the said machine. Figs. 4, 5, and 6 are views illustrating the modes in which the stone or other like material may be cut.

In carrying out my invention I use metallic disks revolving at high rates of speed and supplied with abrading material, and present the blocks to the same in such manner as to score or groove the same to such extent that the material between the grooves may be removed in blocks of a size available for other purposes and without expensive hand-labor.

The fact being known that a rapidly-revolving iron or steel blade (the revolutions being from ten to fifteen thousand per minute) will act to cut a groove in a slab or block of marble, slate, &c., with great rapidity, it will be seen that it may be brought against the face of such block, sunk in the same, and carried longitudinally for any desired distance without scoring the block along its entire length. Thus, if it is desired to remove the part X of a block, A, Fig. 5, two grooves or scores, $y\ y$, are made by means of the revolving disk C, a portion, $s$, is chiseled away by hand to form a terminal opening, and the part X is split away along the line $e$ by wedges, so as to be removed for use, as desired. In like manner the part Y may be removed after scoring the block on the lines $y'\ y'\ y^2$ and cutting away terminal portions $t$.

Where it is desired to remove the entire face of a block, the latter may be scored from both sides by two disks to make slots $y\ y$ on the same plane, so as to leave an intervening undivided part, $w$, which may be split to separate the outer slab, A'.

Different means may be employed for operating the disk or disks. In Figs. 2 and 3 I have shown a machine for using two opposite disks, C C', mounted upon spindles $b\ b'$, supported by a frame, D, so as to revolve in the same vertical plane, the slab A being supported by a carriage, I, sliding on parallel guides $c\ c$. This permits the slab to be brought endwise against the edges of the disks. One or both spindles may be supported by a frame, J, vertically adjustable, so as to permit the disk to be brought edgewise against the face of the slab, and receptacles S S may be used to supply the disks with attrition material—as emery-dust, dry or mixed with water—the great speed of the disk rendering the use of this material very effective, and the action of the disk on the stone is thereby made more rapid than when the abrading material is not used.

I do not claim as of my invention the use of rapidly-revolving metallic disks, but the combination therewith of the receptacles S S for the abrading material.

I claim—

The combination, in a stone-cutting machine, of a frame supporting two spindles, each carrying a thin-metal disk and arranged in the same plane, a carriage for supporting the block to be cut, and independent receptacles for supplying abrading material to each disk, substantially as described.

In testimony whereof I have signed my name to this specification in the presence of two subscribing witnesses.

JAMES W. MALOY.

Witnesses:
 GEORGE R. EAGER,
 CHARLES E. FOSTER.